(12) United States Patent
Wang et al.

(10) Patent No.: US 12,175,724 B2
(45) Date of Patent: Dec. 24, 2024

(54) HARDWARE ACCELERATION METHOD AND SYSTEM BASED ON SCALE-INVARIANT FEATURE TRANSFORM ALGORITHM

(71) Applicant: Huazhong University of Science and Technology, Hubei (CN)

(72) Inventors: Chao Wang, Hubei (CN); Guoyi Yu, Hubei (CN); Bingqiang Liu, Hubei (CN); Zehua Yin, Hubei (CN); Xupeng Zhang, Hubei (CN); Zixuan Shen, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 350 days.

(21) Appl. No.: 17/816,559

(22) Filed: Aug. 1, 2022

(65) Prior Publication Data

US 2023/0386169 A1 Nov. 30, 2023

(30) Foreign Application Priority Data

May 30, 2022 (CN) .......................... 202210604616.4

(51) Int. Cl.
  *G06V 10/46* (2022.01)
  *G06T 5/20* (2006.01)
  *G06T 5/40* (2006.01)
  *G06V 10/25* (2022.01)

(52) U.S. Cl.
  CPC .............. *G06V 10/462* (2022.01); *G06T 5/20* (2013.01); *G06T 5/40* (2013.01); *G06V 10/25* (2022.01); *G06T 2207/20016* (2013.01)

(58) Field of Classification Search
  CPC ...... G06V 10/462; G06V 10/50; G06V 10/25; G06V 10/74; G06V 10/16; G06V 10/454; G06V 20/56; G06V 10/82; G06T 5/40; G06T 5/20; G06T 2207/20016; G06N 3/145
  See application file for complete search history.

(56) References Cited

U.S. PATENT DOCUMENTS

2014/0321755 A1* 10/2014 Iwamoto .............. G06V 10/462
  382/197

* cited by examiner

*Primary Examiner* — Bobbak Safaipour
*Assistant Examiner* — Michael Kim Maiden
(74) *Attorney, Agent, or Firm* — HSML P.C.

(57) ABSTRACT

A hardware acceleration method and system based on a scale-invariant feature transform algorithm in the field of hardware acceleration design of algorithms is disclosed. The architecture mainly includes two parts: keypoint detection and descriptor generation. Four buffers between these two parts are ping-ponged to increase the system processing speed. In the keypoint detection part, firstly, multi-layer Gaussian pyramid and Gaussian difference pyramid are calculated in parallel; through parallel calculation, the keypoints and gradient magnitudes and orientations are obtained. In the descriptor generation part, a keypoint region division strategy based on the circular keypoint region is provided, and the parallel calculation of a main orientation calculation module and a descriptor generation module are implemented. Finally, the output is obtained through descriptor rearrangement and dimensionality reduction module.

7 Claims, 5 Drawing Sheets

HARDWARE ACCELERATION METHOD AND SYSTEM BASED ON SCALE-INVARIANT FEATURE TRANSFORM ALGORITHM

TECHNICAL FIELD

The present invention belongs to the field of hardware acceleration design of algorithms, and more particularly, relates to a hardware acceleration method and system based on a scale-invariant feature transform algorithm.

BACKGROUND ART

Scale-invariant feature transform (SIFT) algorithm is a local feature extraction algorithm, which can solve the matching problem caused by translation, rotation, and affine transformation of two images. The SIFT algorithm can convert an image into a set with a large number of local feature vectors (SIFT descriptors). This algorithm can obtain relatively reliable matching results even under the conditions of image affine changes, 3D viewing angle changes, scaling, exposure changes, and noise addition. Therefore, the SIFT algorithm has been widely used in intelligent autonomous mobile robots and autonomous driving for mapping and positioning, matching reconstruction, motion segmentation tracking, image panorama fusion, and other scenarios that require image recognition and matching.

However, existing SIFT hardware acceleration systems can only achieve relatively low frame rates. In 2012, the SIFT hardware acceleration system published by F. Huang et al. in the IEEE Transactions on Circuits and Systems for Video Technology adopted the design strategy of an interaction between a keypoint detection part and a descriptor generation part, which has the problem of low processing speed. In 2016, the SIFT hardware acceleration system published by J. Yum et al. in the IEEE Transactions on Circuits and Systems for Video Technology reduced the hardware overhead of storage through optimized storage design. However, since the main orientation calculation process and the descriptor generation process in the descriptor generation part is still performed serially, the processing speed is limited.

SUMMARY OF THE INVENTION

In view of the defects and improvement needs in the existing technology, the present invention provides a hardware acceleration method and system based on a scale-invariant feature transform algorithm, aiming at solving the technical problems of limited parallelism in the design of the existing SIFT acceleration systems and low processing frame rate.

In order to achieve the above objective, in a first aspect, the present invention provides a hardware acceleration method based on a scale-invariant feature transform algorithm, comprising the following steps:

S11, detecting SIFT keypoints and calculating gradient magnitudes and orientations of all pixels in parallel;

S12, storing the keypoints and the corresponding gradient magnitude and orientation thereof in odd-numbered frames and even-numbered frames, respectively, so as to implement a ping-pong operation;

S21, for each keypoint, determining its circular keypoint region, dividing the circular keypoint region into 16N regions equally, and using concentric circles in the circular keypoint region to divide each of the regions into two sub-regions, thus obtaining 32N sub-regions;

S22, calculating in parallel in parallel a main orientation of SIFT keypoints and histograms of 32N sub-regions, wherein for each histogram, 16N orientations are calculated;

S23, after the main orientation and 32N histograms are determined, first adjusting the 16N orientations in each histogram according to the main orientation to realize a rotation operation inside each sub-region; adjusting an order of the 32N histograms according to the main orientation to realize a rotation operation among the sub-regions; adding vectors of adjacent 4N orientations in each histogram to obtain 8 vectors to realize vector dimension reduction in each sub-region; and finally, adding histogram data of adjacent 4N sub-regions among the 32N sub-regions to obtain 16 histograms so as to realize vector dimension reduction among the sub-regions, where N is a positive integer; and S24, obtaining a keypoint descriptor by normalizing a finally obtained 128-dimensional vector.

Further, prior to step S11, the method further comprises:

S10, performing Gaussian filtering on an original image, so as to construct in parallel a multi-layered Gaussian pyramid and Gaussian difference pyramid.

Further, step S11 comprises:

determining the SIFT keypoint based on the Gaussian difference pyramid, and at the same time, calculating the gradient magnitudes and orientations of all pixels based on the Gaussian pyramid.

Further, in step S23, the adding of the vectors of the adjacent 4N orientations in each histogram to obtain the 8 vectors comprises: adding the vectors in the adjacent 4N orientations in each histogram in sequence at an interval of 2N orientations to obtain the 8 vectors.

Further, in step S23, the adding of the histogram data of the adjacent 4N sub-regions among the 32N sub-regions to obtain the 16 histograms comprises:

dividing 16N regions into 16N inner sub-regions and 16N outer sub-regions by using the concentric circles of the circular keypoint region, for the 16N inner sub-regions, adding the histogram data of the adjacent 4N sub-regions at an interval of 2N sub-regions to obtain 8 histograms; and for the 16N outer sub-regions, adding the histogram data of the adjacent 4N sub-regions at an interval of 2N sub-regions to obtain 8 histograms, so as to obtain the 16 histograms.

In a second aspect, the present invention provides a hardware acceleration system based on SIFT algorithm, comprising:

a first parallel processing module, which is configured to detect SIFT keypoints and calculate gradient magnitudes and orientations of all pixels in parallel;

a buffer module, which is configured to store the keypoint and the corresponding gradient magnitude and orientation thereof in odd-numbered frames and even-numbered frames, respectively, so as to implement a ping-pong operation;

a second parallel processing module, which is configured to, for each keypoint, determine its circular keypoint region, dividing the circular keypoint region into 16N regions equally, and use concentric circles in the circular keypoint region to divide each of the regions into two sub-regions, thus obtaining 32N sub-regions, as well as calculating in parallel the main orientation of SIFT keypoints and histograms of 32N sub-regions, wherein for each histogram, 16N orientations is calculated;

a rearrangement and dimensionality reduction module, which is configured to, after the main orientation and 32N histograms are determined, first, adjust the 16N orientations in each histogram according to the main orientation to realize a rotation operation inside each sub-region; adjust an order of the 32N histograms according to the main orientation to realize a rotation operation among the sub-regions; add vectors of adjacent 4N orientations in each histogram to obtain 8 vectors to realize vector dimension reduction in each sub-region; and finally, add histogram data of adjacent 4N sub-regions among the 32N sub-regions to obtain 16 histograms so as to realize vector dimension reduction among the sub-regions, where N is a positive integer; and an output module, which is configured to obtain a keypoint descriptor by normalizing a finally obtained 128-dimensional vector.

In a third aspect, the present invention provides a computer device. The device includes: a memory and a processor; the memory is configured to store computer instructions; the processor is configured to execute the computer instructions to implement the hardware acceleration method based on a scale-invariant feature transform algorithm as set forth in the first aspect.

In general, through the above technical solutions provided by the present invention, the following beneficial effects can be achieved:

Compared with the existing SIFT hardware acceleration systems, the present invention proposes a novel fully parallel SIFT acceleration system architecture. This architecture mainly includes two parts: keypoint detection and descriptor generation. Four buffers between these two parts are ping-ponged to increase the system processing speed. In the keypoint detection part, firstly, multi-layer Gaussian pyramid and Gaussian difference pyramid are calculated in parallel; through parallel calculation, the keypoints and gradient magnitudes and orientations are obtained. In the descriptor generation part, the present invention proposes a keypoint region division strategy based on the circular keypoint region, and realizes the parallel calculation of a main orientation calculation module and a descriptor generation module. Finally, the output is obtained through descriptor rearrangement and dimensionality reduction module. In this way, full parallelism is realized, and the processing frame rate can be increased.

DESCRIPTION OF EMBODIMENTS

In order to make the objectives, technical solutions, and advantages of the present invention clearer, the present invention will be further described in detail below with reference to the accompanying drawings and specific embodiments. It should be understood that the specific embodiments described herein are only used to explain the present invention, but not to limit the present invention. In addition, the technical features involved in various embodiments of the present invention described below can be combined with one another as long as there is no conflict therebetween.

Figure 1:
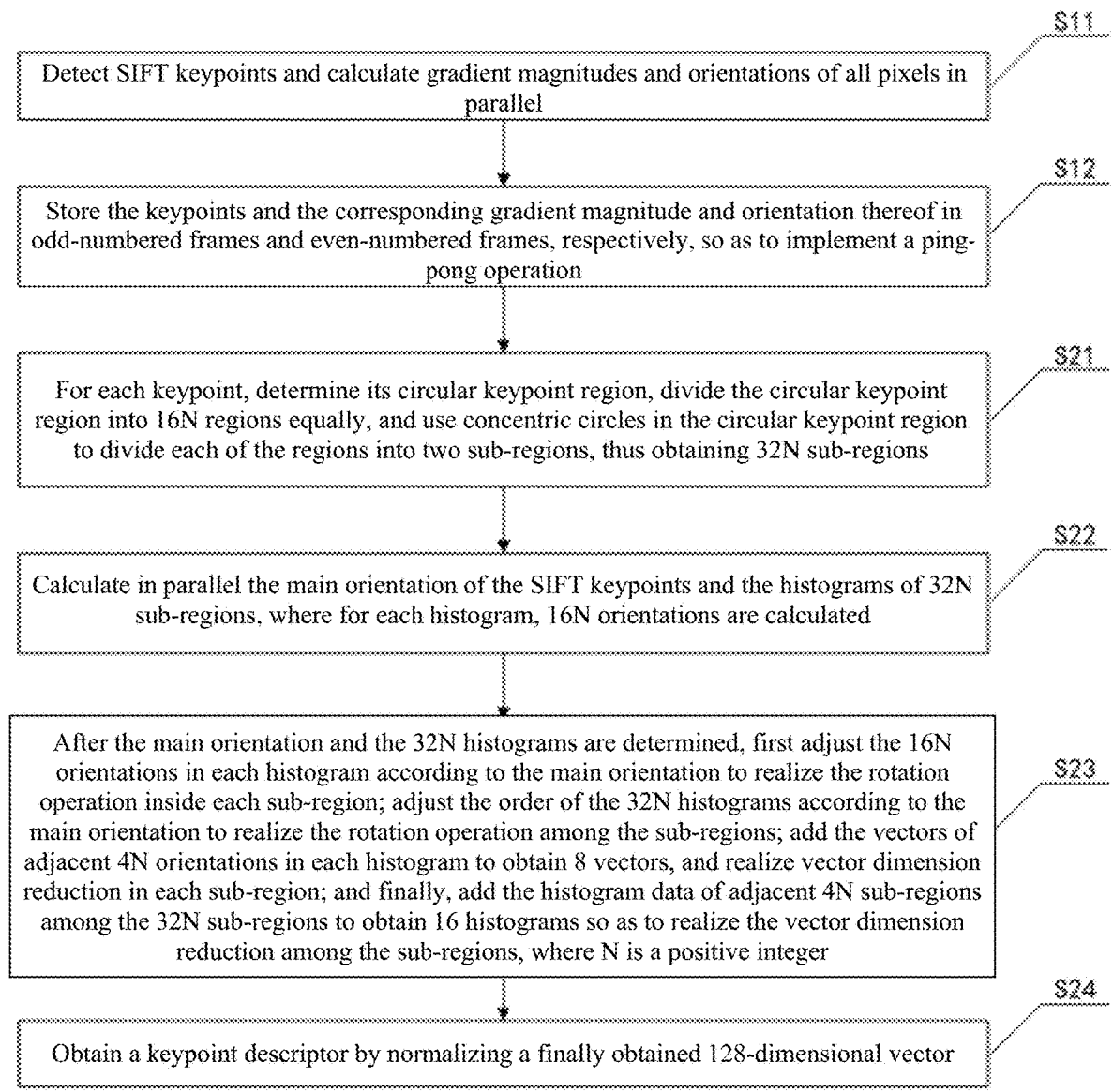
FIG. 1 is a flow chart of a hardware acceleration method based on the scale-invariant feature transform algorithm.
Figure 2:
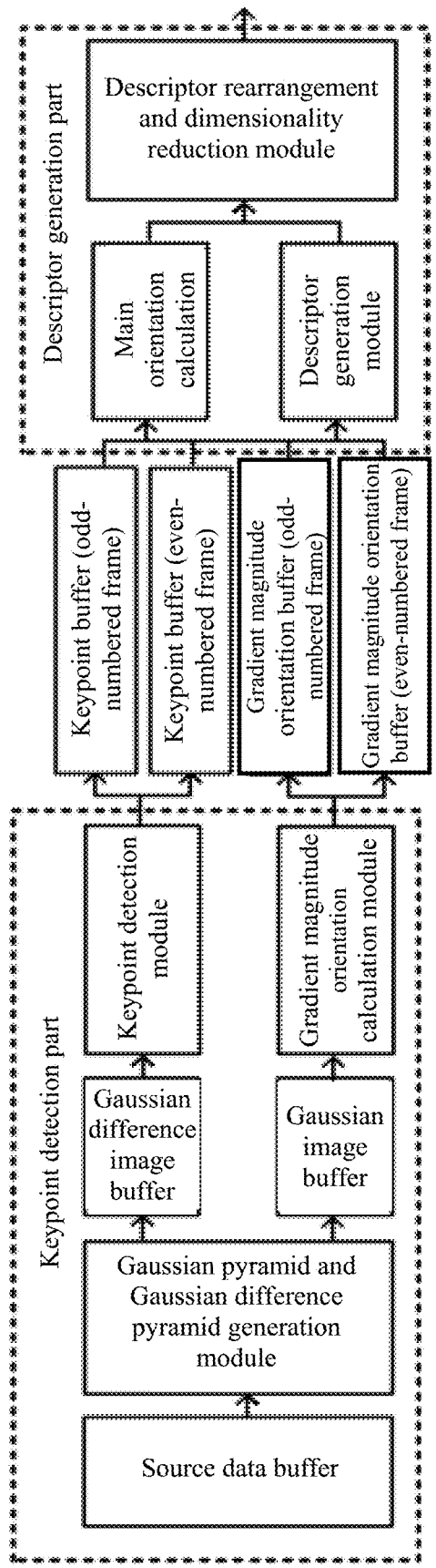
FIG. 2 is an architecture diagram of a hardware acceleration system based on a scale-invariant feature transform algorithm.
Figure 3:
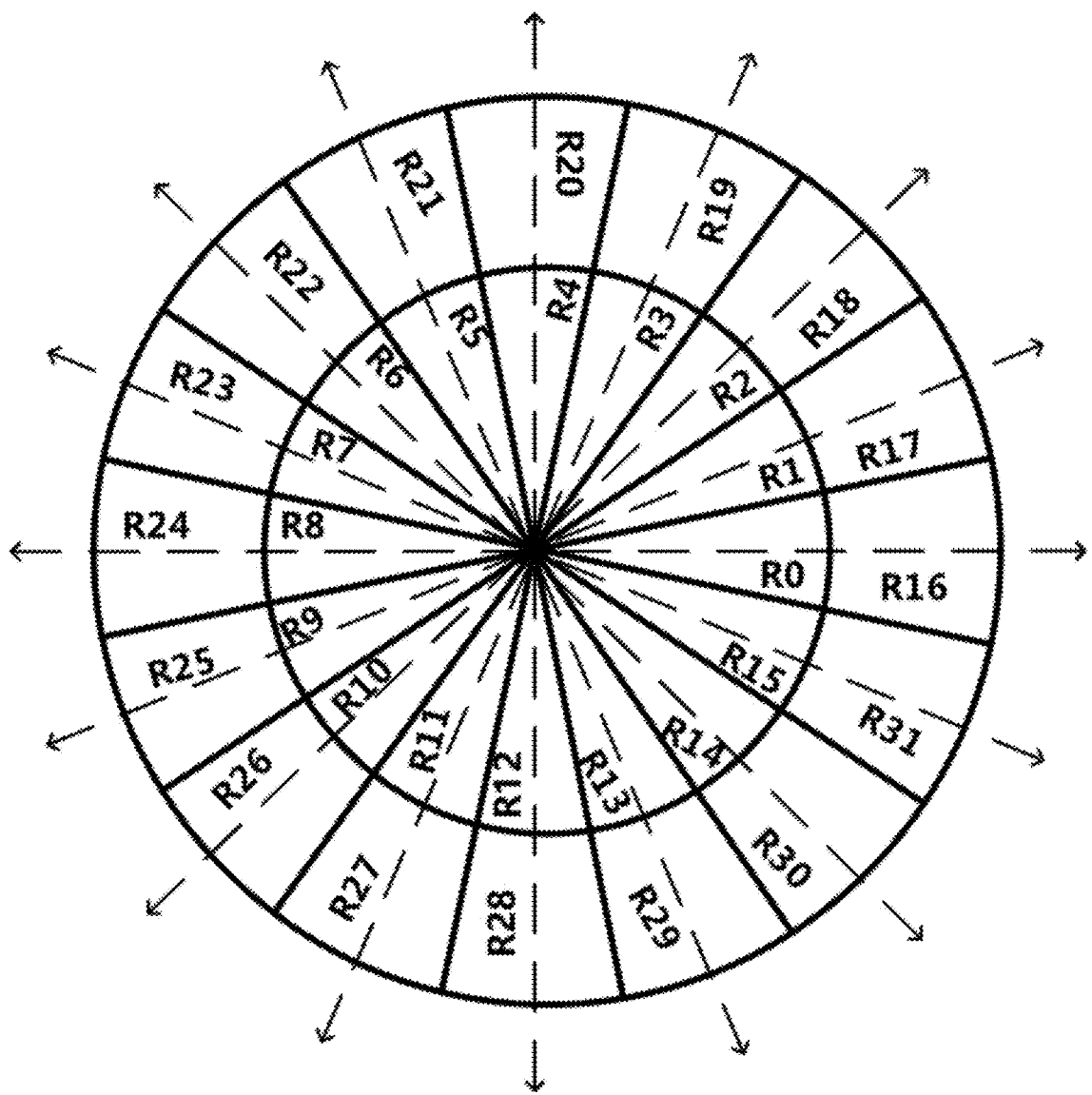
FIG. 3 is the schematic diagram of a keypoint region division method used by a descriptor generation module.
Figure 4:
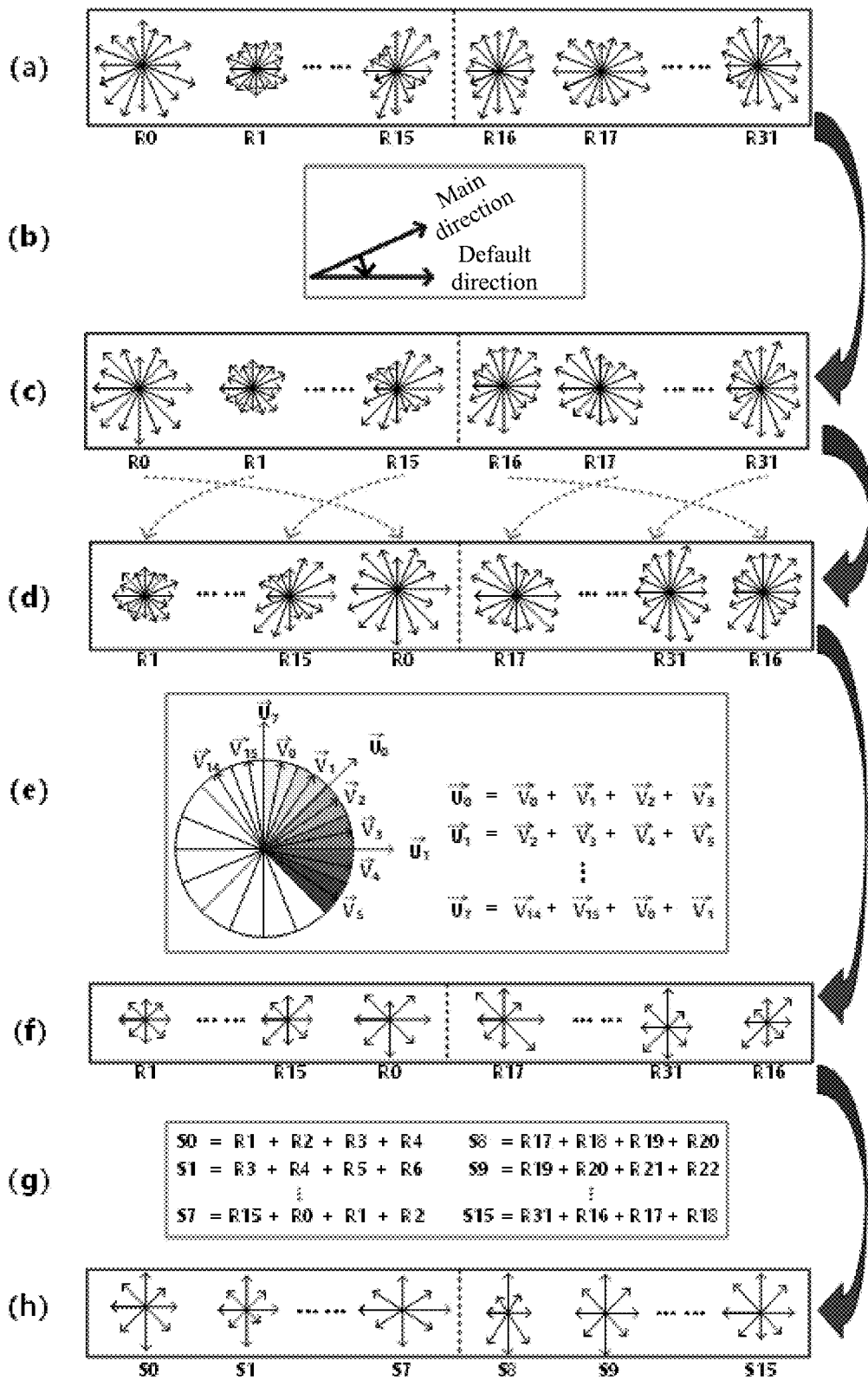
FIG. 4 is a schematic diagram of descriptor rearrangement and dimensionality reduction.

With reference to FIG. 1, in conjunction with FIGS. 2 to 4, the present invention provides a hardware acceleration method based on a scale-invariant feature transform algorithm. The method mainly includes two parts: keypoint detection and descriptor generation. Four buffers between these two parts are ping-ponged to increase the system processing speed. In the keypoint detection part, firstly, multi-layer Gaussian pyramid and Gaussian difference pyramid are calculated in parallel; through parallel calculation, the keypoints and gradient magnitudes and orientations are obtained. In the descriptor generation part, the present invention proposes a keypoint region division strategy based on the circular keypoint region, and realizes the parallel calculation of a main orientation calculation module and a descriptor generation module. Finally, the output is obtained through descriptor rearrangement and dimensionality reduction module. Specifically, the keypoint detection part includes operations S11 and S12, and the descriptor generation part includes operations S21 to S24.

Operation S11: detect SIFT keypoints and calculate gradient magnitudes and orientations of all pixels in parallel.

In this embodiment, before step S11, the method further includes:

Operation S10: perform Gaussian filtering on an original image, so as to construct in parallel a multi-layered Gaussian pyramid and a Gaussian difference pyramid.

The construction of the scale space can be achieved by Gaussian convolution, $I(x,y)$ is defined to represent an original image, $G(x,y,\sigma)$ represents a Gaussian function, and $$G(x, y, \sigma) = \frac{1}{2\pi\sigma^2} e^{-\frac{x^2+y^2}{2\sigma^2}}.$$

$L(x,y,\sigma)$ is referred to as a scale space of the image. The scale space of the image is defined as the convolution of the scale-varying Gaussian function with the original image; that is, $L(x,y,\sigma)=G(x,y,\sigma)*I(x,y)$, where * represents a convolution operation and $\sigma$ represents a scale space factor.

In the SIFT algorithm, the specific representation of the scale space is the Gaussian pyramid. It is a pyramid-shaped structure composed of large to small images obtained by means of downsampling Gaussian blurred images. With regard to the construction of the Gaussian pyramid, two steps are needed: ① perform Gaussian blur with different scales on the image; ② downsample the Gaussian blurred image. Based on the original image, Gaussian blur can be performed on the original image by using Gaussian functions with different scale factors $\sigma$, thus the first octave of Gaussian pyramids is composed of images with multiple layers of different blurring degrees is obtained. Next, downsampling is performed on a layer in the first octave of Gaussian pyramids to obtain an image whose length and width are half of those of the original image as the first layer of a second octave; the other layers of the second octave are then obtained by means of Gaussian blurring of the image using the Gaussian function with different scale factors σ. Other octaves can be formed in the same way.

After generating the Gaussian pyramid and Gaussian difference pyramid, the existing methods first determine the SIFT keypoint based on the Gaussian difference pyramid, and then calculates the gradient magnitude and orientation of the SIFT keypoint based on the Gaussian pyramid. Different from the existing methods, the present invention detects SIFT keypoints and calculates gradient magnitudes and orientations of all pixels in parallel, which can speed up the calculation process.

Specifically, the magnitude and orientation of the gradient can be calculated as follows:

$$m(x, y) = \sqrt{(L(x+1, y) - L(x-1, y))^2 + (L(x, y+1) - L(x, y-1))^2};$$

$$\theta(x, y) = \tan^{-1}\left[\frac{L(x, y+1) - L(x, y-1)}{L(x+1, y) - L(x-1, y)}\right]$$

where m(x,y) is the gradient magnitude of the pixel point, θ(x,y) is the gradient orientation of the pixel point, and L is the scale space where the keypoint is located.

Operation S12: store the keypoint and the corresponding gradient magnitude and orientation thereof in odd-numbered frames and even-numbered frames, respectively, so as to implement a ping-pong operation.

In this embodiment, in the keypoint detection part, a Gaussian pyramid and Gaussian difference pyramid generation module perform Gaussian filtering on the original frame image to obtain a Gaussian pyramid and a Gaussian difference pyramid and store them in two buffers respectively. The keypoint detection module reads out the pixel values of the Gaussian difference pyramid image from the Gaussian difference image buffer, compares extreme points to find a candidate keypoints, and then obtains the final keypoint by means of threshold comparison and edge response elimination and stores them in a keypoint buffer. At the same time, the gradient magnitude and orientation calculation module reads out the pixel values of the Gaussian pyramid image from the Gaussian image buffer, calculates the gradient magnitude and orientation for each pixel, and stores the data in a gradient magnitude and orientation buffer.

There are two sets of keypoint buffers and gradient magnitude orientation buffers, which store keypoints and gradient magnitudes and orientations for odd-numbered frames and even-numbered frames respectively so as to implement a ping-pong operation. In this way, the processing speed of the whole system can be determined by the slower processing one between the keypoint detection part and the descriptor generation part.

Operation S21: for each keypoint, determine its circular keypoint region, divide the circular keypoint region into 16N regions equally, and use concentric circles in the circular keypoint region to divide each of the regions into two sub-regions, thus obtaining 32N sub-regions.

In this embodiment, taking N=1 as an example, as shown in FIG. 3, for each keypoint, its circular keypoint region is determined, and the circular keypoint region is then equally divided into 16 regions. Next, concentric circles in the circular keypoint region are used to divide each region into two sub-regions, thereby obtaining 32 non-overlapping sub-regions (R0, R1, . . . , R31). The dashed arrows shown in FIG. 3 indicate 16 orientations.

Compared with the existing methods that divide the region of a keypoint based on a square region, the present invention divides the region of a keypoint based on a circular region, which facilitates the subsequent parallelization of the main orientation calculation step and the descriptor generation step. That is, the descriptor generation step no longer depends on the main orientation obtained in the main orientation calculation step; instead, the preliminary descriptor can be firstly calculated. The process of rotating according to the main orientation of the keypoint in the descriptor generating step in the existing methods can be realized by subsequent descriptor rearrangement. Meanwhile, instead of directly dividing the circular keypoint region into 32 sub-regions, the present invention divides the circular keypoint region into 32 sub-regions as shown in FIG. 3, which can make the pixels in the sub-regions as concentrated as possible.

Operation S22: calculate in parallel the main orientation of SIFT keypoints and histograms of 32N sub-regions, where for each histogram, 16N orientations are calculated.

After the region is divided, the existing methods first calculate the main orientation of the SIFT keypoint, and then calculate the histogram of each sub-region. This serial implementation mode limits the image processing speed of the entire system. Different from the existing methods, the present invention calculates in parallel the main orientation of SIFT keypoint and the histograms of the sub-regions. Through subsequent descriptor rearrangement, the process of rotating according to the main orientation of the keypoint that is first required in the descriptor generating step in the existing methods can be achieved. Finally, the robustness of the descriptor is enhanced by dimensionality reduction.

Operation S23: after the main orientation and the 32N histograms are determined, first adjust the 16N orientations in each histogram according to the main orientation to realize the rotation operation inside each sub-region; adjust the order of the 32N histograms according to the main orientation to realize the rotation operation among the sub-regions; add the vectors of adjacent 4N orientations in each histogram to obtain 8 vectors, and realize vector dimension reduction in each sub-region; and finally, add the histogram data of adjacent 4N sub-regions among the 32N sub-regions to obtain 16 histograms so as to realize the vector dimension reduction among the sub-regions, where N is a positive integer.

In this embodiment, taking N=1 as an example, as shown in FIG. 4, after the main orientation and the 32 histograms are determined, first, according to the main orientation, the rotation operation inside each sub-region shown in FIG. 4(b) is achieved by rearranging the 16 orientations in each histogram as shown in FIG. 4(a), resulting in FIG. 4(c). Next, the order of the 32 histograms is adjusted according to the main orientation to realize the rotation operation of the sub-regions, and obtain FIG. 4(d). Next, as shown in FIG. 4(e), the 16 vectors in each histogram are combined to obtain 8 vectors by means of vector addition to obtain FIG. 4(f), so as to realize the vector dimension reduction in the sub-regions. Finally, as shown in FIG. 4(g), 16 histogram data are obtained by merging and adding 32 histogram data to obtain FIG. 4(h), so as to achieve vector dimension reduction of the sub-regions. Thus, a 128-dimensional vector can be obtained to represent the SIFT descriptor of a keypoint.

Figure 5:
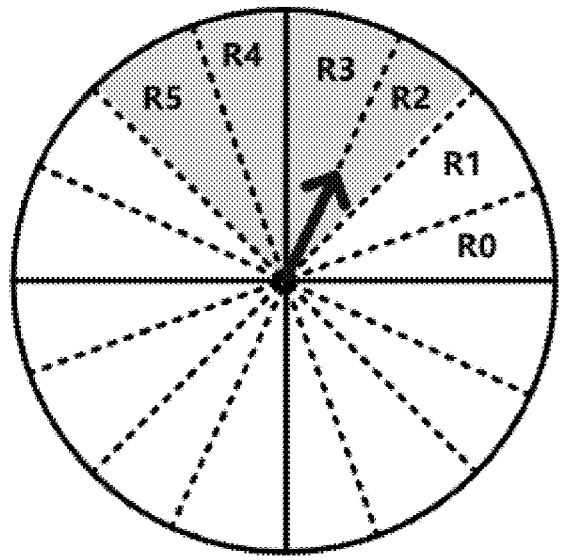
FIG. 5(A) is a schematic diagram of a region division method of overlapping sub-regions.
FIG. 5(B) is a schematic diagram of rotating the main orientation to a default orientation.
Figure 5:
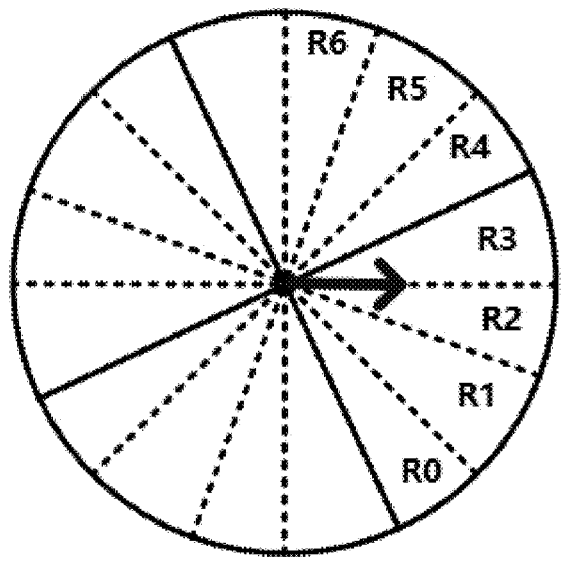

In addition, in this embodiment, the 32 sub-regions do not overlap each other. Compared with the case where the sub-regions overlap, the present invention has better robustness. The specific reasons are as follows: if the sub-regions are overlapped in advance, as shown in FIG. 5(A), R0+R1+R2+R3 is in the sub-region S1, and R2+R3+R4+R5 is in the sub-region S2. The next step should be to rotate the main orientation to the default detection, as shown in FIG. 5(B). After the rotation, R3+R4+R5+R6 should be in a sub-region. At this time, there may be wrongly added parts (R2 should not have been added yet R6 should have been added). Such wrong addition may lead to the deterioration of the robustness of the descriptor.

Operation S24: obtain a keypoint descriptor by normalizing a finally obtained 128-dimensional vector.

A person skilled in the art can easily understand that the above descriptions are only some preferred embodiments of the present invention, and are not intended to limit the present invention. Any modifications, equivalent replacements or improvements made within the principles of the present invention shall be included within the scope of protection of the present invention.

The invention claimed is:

1. A hardware acceleration method based on a scale-invariant feature transform algorithm, wherein the method comprises the following steps:
    S11, detecting SIFT keypoints and calculating gradient magnitudes and orientations of all pixels in parallel;
    S12, storing the keypoints and the corresponding gradient magnitude and orientation thereof in odd-numbered frames and even-numbered frames, respectively, so as to implement a ping-pong operation;
    S21, for each keypoint, determining its circular keypoint region, dividing the circular keypoint region into 16N regions equally, and using concentric circles in the circular keypoint region to divide each of the regions into two sub-regions, thus obtaining 32N sub-regions;
    S22, calculating in parallel a main orientation of SIFT keypoints and histograms of 32N sub-regions, wherein for each histogram, 16N orientations are calculated;
    S23, after the main orientation and 32N histograms are determined, first adjusting the 16N orientations in each histogram according to the main orientation to realize a rotation operation inside each sub-region; adjusting an order of the 32N histograms according to the main orientation to realize a rotation operation among the sub-regions; adding vectors of adjacent 4N orientations in each histogram to obtain 8 vectors to realize vector dimension reduction in each sub-region; and finally, adding histogram data of adjacent 4N sub-regions among the 32N sub-regions to obtain 16 histograms so as to realize vector dimension reduction among the sub-regions, where N is a positive integer; and
    S24, obtaining a keypoint descriptor by normalizing a finally obtained 128-dimensional vector.

2. The hardware acceleration method based on a scale-invariant feature transform algorithm according to claim 1, wherein prior to step 11, the method further comprises:
    S10, performing Gaussian filtering on an original image, so as to construct in parallel a multi-layered Gaussian pyramid and a Gaussian difference pyramid.

3. The hardware acceleration method based on a scale-invariant feature transform algorithm according to claim 2, wherein step S11 comprises:
    determining the SIFT keypoints based on the Gaussian difference pyramid, and at the same time, calculating the gradient magnitudes and orientations of all pixels based on the Gaussian pyramid.

4. The hardware acceleration method based on a scale-invariant feature transform algorithm according to claim 1, wherein in step S23, the adding of the vectors of the adjacent 4N orientations in each histogram to obtain the 8 vectors comprises: adding the vectors in the adjacent 4N orientations in each histogram in sequence at an interval of 2N orientations to obtain the 8 vectors.

5. The hardware acceleration method based on a scale-invariant feature transform algorithm according to claim 1, wherein in step S23, the adding of the histogram data of the adjacent 4N sub-regions among the 32N sub-regions to obtain the 16 histograms comprises:
    dividing 16N regions into 16N inner sub-regions and 16N outer sub-regions by using the concentric circles of the circular keypoint region, for the 16N inner sub-regions, adding the histogram data of the adjacent 4N sub-regions at an interval of 2N sub-regions to obtain 8 histograms; and for the 16N outer sub-regions, adding the histogram data of the adjacent 4N sub-regions at an interval of 2N sub-regions to obtain 8 histograms, so as to obtain the 16 histograms.

6. A hardware acceleration system based on a scale-invariant feature transform algorithm, wherein the system comprises:
    a first parallel processing module, which is configured to detect SIFT keypoints and calculate gradient magnitudes and orientations of all pixels in parallel;
    a buffer module, which is configured to store the keypoints and the corresponding gradient magnitude and orientation thereof in odd-numbered frames and even-numbered frames, respectively, so as to implement a ping-pong operation;
    a second parallel processing module, which is configured to, for each keypoint, determine its circular keypoint region, dividing the circular keypoint region into 16N regions equally, and use concentric circles in the circular keypoint region to divide each of the regions into two sub-regions, thus obtaining 32N sub-regions, as well as calculating in parallel the main orientation of SIFT keypoints and histograms of 32N sub-regions, wherein for each histogram, 16N orientations is calculated;
    a rearrangement and dimensionality reduction module, which is configured to, after the main orientation and 32N histograms are determined, first adjust the 16N orientations in each histogram according to the main orientation to realize a rotation operation inside each sub-region; adjust an order of the 32N histograms according to the main orientation to realize a rotation operation among the sub-regions; add vectors of adjacent 4N orientations in each histogram to obtain 8 vectors to realize vector dimension reduction in each sub-region; and
    finally, add histogram data of adjacent 4N sub-regions among the 32N sub-regions to obtain 16 histograms so as to realize vector dimension reduction among the sub-regions, where N is a positive integer; and
    an output module, which is configured to obtain a keypoint descriptor by normalizing a finally obtained 128-dimensional vector.

7. A computer device, wherein the computer device comprises a memory and a processor; the memory is configured to store computer instructions; the processor is configured to execute the computer instructions to implement the hardware acceleration method based on a scale-invariant feature transform algorithm according to claim 1.

* * * * *